(12) United States Patent
Choi

(10) Patent No.: US 9,093,022 B2
(45) Date of Patent: Jul. 28, 2015

(54) POWER SUPPLY DEVICE, ORGANIC LIGHT EMITTING DISPLAY DEVICE HAVING THE SAME, AND METHOD OF SUPPLYING POWER

(71) Applicant: Samsung Display Co., Ltd., Yongin, Gyeonggi-do (KR)

(72) Inventor: Hak-Ki Choi, Yongin (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/536,423

(22) Filed: Nov. 7, 2014

(65) Prior Publication Data

US 2015/0054817 A1 Feb. 26, 2015

Related U.S. Application Data

(62) Division of application No. 13/492,596, filed on Jun. 8, 2012, now Pat. No. 8,913,408.

(30) Foreign Application Priority Data

Feb. 13, 2012 (KR) .......................... 10-2012-0014532

(51) Int. Cl.
G09G 3/32 (2006.01)
G06F 3/038 (2013.01)
G09G 3/00 (2006.01)
G09G 3/36 (2006.01)

(52) U.S. Cl.
CPC .............. *G09G 3/3208* (2013.01); *G06F 3/038* (2013.01); *G09G 3/003* (2013.01); *G09G 3/3696* (2013.01); *G09G 2320/0209* (2013.01)

(58) Field of Classification Search
CPC ............ H02M 3/33501; G09G 3/3233; G09G 2310/0213

USPC .......................................... 345/77, 52; 363/84
See application file for complete search history.

(56) References Cited

U.S. PATENT DOCUMENTS

| | | | | |
|---|---|---|---|---|
| 6,028,587 A | * | 2/2000 | Igari | 345/597 |
| 6,040,871 A | * | 3/2000 | Andersson | 348/510 |
| 7,151,521 B2 | * | 12/2006 | Willis et al. | 345/99 |
| 8,026,871 B2 | | 9/2011 | Gunner et al. | |
| 8,614,657 B2 | * | 12/2013 | Han et al. | 345/77 |

(Continued)

FOREIGN PATENT DOCUMENTS

| JP | 2005-338215 | 12/2005 |
|---|---|---|
| KR | 10 2009 0117641 | 11/2009 |
| KR | 10 2010 0078259 | 7/2010 |

*Primary Examiner* — Dwayne Bost
*Assistant Examiner* — Chineyere Wills-Burns
(74) *Attorney, Agent, or Firm* — Knobbe Martens Olson & Bear LLP

(57) ABSTRACT

A power supply device includes an SMPS circuit including an electric transformer having first and second stages, the SMPS circuit generating a second stage output voltage using the electric transformer, a power switcher receiving and switching the second stage output voltage to generate a first power voltage having logic high and low levels in one frame, and a PWM controller controlling a voltage level of the second stage output voltage by providing a control signal to the first stage. The first power voltage is simultaneously provided to a plurality of pixels, and a magnitude of the logic low level is increased or decreased according to a magnitude of an image load, where the magnitude of the image load is dependent on a color and a gradation level of an image to be displayed in a next frame.

5 Claims, 9 Drawing Sheets

(56) References Cited

U.S. PATENT DOCUMENTS

| | | | |
|---|---|---|---|
| 2004/0140972 A1* | 7/2004 | Hirota et al. | 345/204 |
| 2005/0073867 A1* | 4/2005 | Byun | 363/84 |
| 2005/0269020 A1 | 12/2005 | Matsuoka | |

* cited by examiner

POWER SUPPLY DEVICE, ORGANIC LIGHT EMITTING DISPLAY DEVICE HAVING THE SAME, AND METHOD OF SUPPLYING POWER

CROSS-REFERENCE TO RELATED APPLICATIONS

This application is a divisional of U.S. application Ser. No. 13/492,596, filed Jun. 8, 2012, which claims priority to Korean Patent Application No. 10-2012-0014532 filed on Feb. 13, 2012, the contents of which are herein incorporated by reference in their entireties.

BACKGROUND

1. Field

This disclosure relates to a power supply device that supplies a variable power voltage, and that controls a voltage level of the variable power voltage at a first stage of an electric transformer.

2. Description of the Related Technology

According to a sequential emission method among a plurality of methods for driving an organic light emitting display (OLED) device, data may be scanned by each scan-line in response to a scan signal that is sequentially applied. Then, organic light emitting diodes may emit light by each scan-line in response to an emission signal that is sequentially applied. However, when a stereoscopic image (such as for example, a 3D image) is implemented by the sequential emission method, a crosstalk may be generated, which may cause dizziness to a user of the display device. In order to overcome this problem, a simultaneous emission method has been suggested.

The simultaneous emission method is suitable for implementing a stereoscopic image (such as for example a 3D image). According to the simultaneous emission method, all organic light emitting diodes may simultaneously emit light based on a power voltage in an emission period, the power voltage cyclically varying as the OLED device operates (, after all data are scanned by each scan-line in response to a scan signal that is sequentially applied in a scan period. However, the simultaneous emission method may result in high power consumption for generating the variable power voltage.

SUMMARY OF CERTAIN INVENTIVE ASPECTS

Some embodiments disclosed herein provide a power supply device capable of supplying a power voltage of which a voltage level varies according to a magnitude of an image load, capable of eliminating a DC-DC converter coupled to a second stage of an electric transformer, and capable of controlling a voltage level of the power voltage at a first stage of the electric transformer.

Some embodiments provide an organic light emitting display (OLED) device having the power supply device capable of supplying a variable power voltage.

Some embodiments provide a method of supplying power capable of supplying a variable power voltage, and capable of controlling a voltage level of the power voltage without a DC-DC converter.

According to some embodiments, a power supply device may include a switching mode power supply (SMPS) circuit unit including an electric transformer having a first stage and a second stage, the SMPS circuit unit configured to generate a second stage output voltage by using the electric transformer, a power switching unit that receives the second stage output voltage, and further configured to switch the second output voltage to generate a first power voltage that has a logic high level and a logic low level in one frame, and a pulse width modulation (PWM) control unit that controls a voltage level of the second stage output voltage by providing a control signal to the first stage of the electric transformer. The first power voltage may be simultaneously provided to a plurality of pixels included in a display panel, and a magnitude of a logic low level of the first power voltage may be determined according to a magnitude of an image load, where the magnitude of the image load is determined by a color and a gradation level of an image to be displayed in a next frame.

A period of a logic high level of the first power voltage may correspond to a period in which the pixels are sequentially scanned, and a period of a logic low level of the first power voltage may correspond to a period in which organic light emitting diodes of the pixels simultaneously emit light.

The PWM control unit may include a timing controller that generates a PWM signal, a digital-to-analog converter that receives the PWM signal, and converts the PWM signal to generate a feed-forward voltage signal, and an output voltage controller that generates the control signal based on the feed-forward voltage signal, and provides the control signal to the first stage of the electric transformer.

A magnitude of a logic high level of the feed-forward voltage signal may be proportional to the on-duty ratio of the PWM signal, and the first power voltage may be inversely proportional to the feed-forward voltage signal.

An on-duty ratio of the PWM signal and a voltage level of the feed-forward voltage signal may be decreased, and a magnitude of a logic low level of the first power voltage may be increased when a maximum gradation level of an image that the display panel displays is high, and an on-duty ratio of the PWM signal and a voltage level of the feed-forward voltage signal may be increased, and a magnitude of a logic low level of the first power voltage may be decreased when a maximum gradation level of the image that the display panel displays is low.

The SMPS circuit unit may include an input unit that rectifies and filters an alternating voltage to generate a direct-current (DC) voltage having a high voltage level, a control unit that receives the DC voltage from the input unit, receives the control signal from the PWM control unit, and generates a first stage output voltage from the DC voltage based on the control signal, a transformation unit that receives the first stage output voltage from the control unit, and converts the first stage output voltage to generate the second stage output voltage, and an output unit that filters the second stage output voltage.

The PWM control unit may receive the second stage output voltage as a feedback voltage signal, and may generate the control signal based on the feedback voltage signal to stabilize the second stage output voltage.

The power supply device may further include an opto-coupler that is coupled between an output terminal of the SMPS circuit unit and the PWM control unit.

The opto-coupler may decouple the first stage of the SMPS circuit unit from the second stage of the SMPS circuit unit when the PWM control unit receives the feedback voltage signal.

The power supply device may further include a memory unit that provides a pixel information signal to the PWM control unit.

The pixel information signal may include information related to the color and the gradation level of the image to be displayed in the next frame.

An on-duty ratio of the PWM signal may be controlled based on the pixel information signal.

According to some embodiments, an organic light emitting display device may include a display panel having a plurality of pixels, a scan driver that sequentially provides a scan signal to the pixels via a plurality of scan-lines, a data driver that provides a data signal to the pixels via a plurality of data-lines based on the scan signal, a first power supply device that generates a first power voltage to simultaneously provide the first power voltage to the pixels, the first power voltage having a logic high level and a logic low level in one frame, a magnitude of a logic low level of the first power voltage being determined according to a magnitude of an image load, where the magnitude of the image load is determined by a color and a gradation level of an image to be displayed in a next frame, a second power supply device that generates a second power voltage to simultaneously provide the second power voltage to the pixels, the second power voltage having a logic high level and a logic low level in one frame, and a timing controller that controls the scan driver, the data driver, the first power supply device, and the second power supply device.

A period of a logic high level may correspond to a period in which the pixels are sequentially scanned, and a period of a logic low level may correspond to a period in which organic light emitting diodes of the pixels simultaneously emit light.

The organic light emitting display device may further include a memory unit that provides a pixel information signal to the first power supply device.

The pixel information signal may include information related to the color and the gradation level of the image to be displayed in the next frame.

The first power supply device may generate a PWM signal based on the pixel information signal, and the magnitude of a logic low level of the first power voltage may be controlled based on an on-duty ratio of the PWM signal.

According to some embodiments, a method of supplying power may include a step of generating a pixel information signal based on a color and a gradation level of an image to be displayed by a plurality of pixels in a next frame, a step of generating a PWM signal having an on-duty ratio that is determined according to the pixel information signal, a step of generating a feed-forward voltage signal as an analog signal by converting the PWM signal, a step of generating a control signal based on the feed-forward voltage signal, the control signal controlling a second stage output voltage of an electric transformer included in a switching mode power supply (SMPS) circuit unit, a step of providing the control signal to a first stage of the electric transformer, a step of generating the second stage output voltage based on the control signal, a step of generating a first power voltage by switching the second stage output voltage, the first power voltage having a logic high level and a logic low level in one frame, and a step of simultaneously providing the first power voltage to the pixels in an emission period.

Organic light emitting diodes included in the pixels may simultaneously emit light based on the first power voltage.

Therefore, embodiments of a power supply device may reduce power consumption by supplying a power voltage of which a voltage level varies according to a magnitude of an image load. In addition, the power supply device may eliminate a DC-DC converter coupled to a second stage of an electric transformer, and may control a voltage level of the power voltage at a first stage of the electric transformer. Thus, a circuit structure may be simplified, and a power loss due to additional power change operations of the DC-DC converter may be prevented.

In addition, embodiments of an organic light emitting display (OLED) device may have a simplified circuit structure, and may operate with low power consumption.

Further, embodiments of a method of supplying power may reduce power consumption by supplying a power voltage of which a voltage level varies according to a magnitude of an image load.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF CERTAIN INVENTIVE EMBODIMENTS

Figure 1:
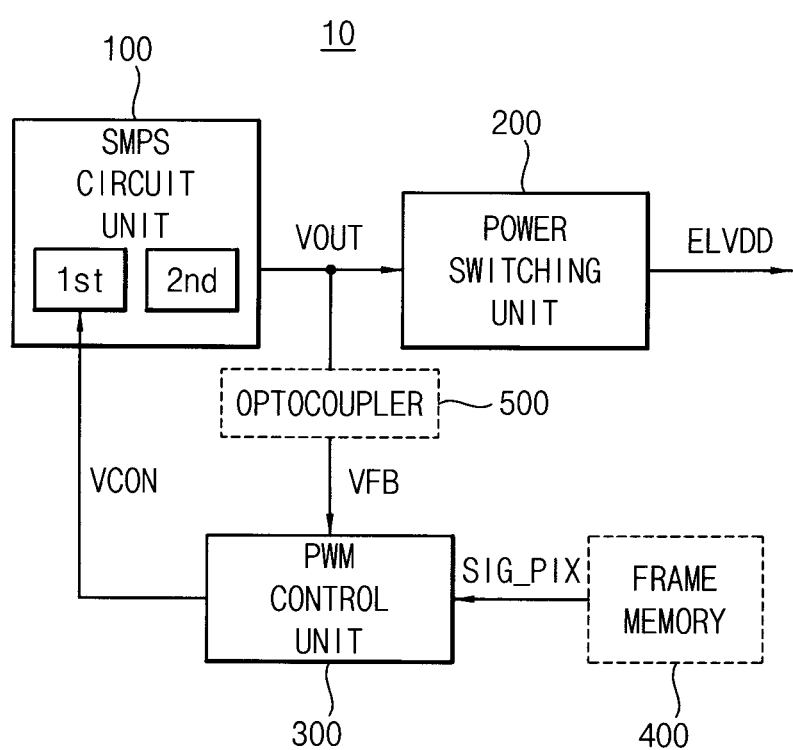
FIG. 1 is a block diagram illustrating an embodiment of a power supply device.

Various embodiments will be described more fully hereinafter with reference to the accompanying drawings, in which some embodiments are shown. The present inventive concepts may, however, be embodied in many different forms and should not be construed as limited to the embodiments set forth herein. Rather, these embodiments are provided so that this disclosure will be thorough and complete, and will fully convey the scope of the present inventive concepts to those skilled in the art. In the drawings, the sizes and relative sizes of layers and regions may be exaggerated for clarity. Like numerals generally refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an embodiment of a power supply device.

Referring to FIG. 1, the power supply device 10 may include a switching mode power supply (SMPS) circuit unit 100, a power switching unit 200, and a pulse width modulation (PWM) control unit 300.

In some embodiments, the SMPS circuit unit 100 may include an electric transformer having a first stage, 1st, and a second stage, 2nd. The SMPS circuit unit 100 may generate a second stage output voltage VOUT by using the electric transformer. In addition, the SMPS circuit unit 100 may receive a control signal VCON at the first stage 1st of the electric transformer, and may control a voltage level of the second stage output voltage VOUT based on the control signal VCON.

The power switching unit 200 may receive the second stage output voltage VOUT from the SMPS circuit unit 100, and may generate a first power voltage ELVDD by switching the second stage output voltage VOUT. The first power voltage ELVDD may have a logic high level and a logic low level in one frame. In some embodiments, the first power voltage ELVDD may only have a logic high level or a logic low level in one frame. A period of a logic high level of the first power voltage ELVDD may correspond to a period (for example, a scan period) in which a plurality of pixels included in a display panel are sequentially scanned. A period of a logic low level of the first power voltage ELVDD may correspond to a period (for example, an emission period) in which a plurality of organic light emitting diodes included in the pixels simultaneously emit light. The logic high level and the logic low level of the first power voltage ELVDD may correspond to other periods in other embodiments. In some embodiments, for example, a period of a logic low level of the first power voltage ELVDD may correspond to the scan period, and a period of a logic high level of the first power voltage ELVDD may correspond to the emission period.

The PWM control unit 300 may generate the control signal VCON, and may provide the control signal VCON to the first stage 1st of the electric transformer. In some embodiments, the power supply device 10 may further include a memory unit (such as for example, a frame memory) 400. The memory unit 400 may generate a pixel information signal SIG_PIX by analyzing a color and a gradation level of an image to be displayed by a display panel in a next frame, and may provide the pixel information signal SIG_PIX to the PWM control unit 300. Then, the PWM control unit 300 may generate the control signal VCON based on the pixel information signal SIG_PIX. In addition, the SMPS circuit unit 100 and the power switching unit 200 may generate the first power voltage ELVDD of which a voltage level is determined based on the control signal VCON. Hence, the power supply device 10 may generate the first power voltage ELVDD that is determined (and/or changed) according to a magnitude of an image load (i.e., a load on a plurality of pixels included in the display panel). For example, when the display panel displays a white color image having a high gradation, the image load may be great (i.e., a great load on the pixels). On the other hand, when the display panel displays a red color image having a low gradation or a black color image having a low gradation, the image load may be small (i.e., a small load on the pixels). The pixel information signal SIG_PIX may be generated based on a magnitude of the image load. A process for controlling a voltage level of the first power voltage ELVDD based on a magnitude of the image load will be described in further detail referring to FIGS. 5 and 6 below.

In some embodiments, the PWM control unit 300 may receive the second stage output voltage VOUT as a feedback voltage signal VFB. The PWM control unit 300 may stabilize the second stage output voltage VOUT by generating the control signal VCON based on the feedback voltage signal VFB.

In some embodiments, the power supply device 10 may further include opto-coupler 500 that is coupled between an output terminal of the SMPS circuit unit 100 and the PWM control unit 300. The opto-coupler 500 may be a photo-coupler. The opto-coupler 500 may decouple the first stage 1st of the SMPS circuit unit 100 from the second stage 2nd of the SMPS circuit unit 100 when the PWM control unit 300 receives the feedback voltage signal VFB. Thus, the control signal VCON may be more stabilized.

Conventional power supply devices employing a simultaneous emission method need to include an additional DC-DC converter. A control unit included in the additional DC-DC converter controls a power voltage so that a variable power voltage may be generated. That is, a variable power voltage (i.e., a power voltage for organic light emitting diodes) may be generated after an output of the SMPS circuit unit passes through the DC-DC converter. As a result, a power loss due to additional power change operations may be caused. Therefore, embodiments disclosed herein may simplify a structure of the power supply device, and may reduce power consumption by eliminating an additional DC-DC converter from the power supply device, and by including a control unit 120 (shown in FIG. 2) for controlling a variable power voltage at the first stage 1st of the SMPS circuit unit 100.

Figure 2:
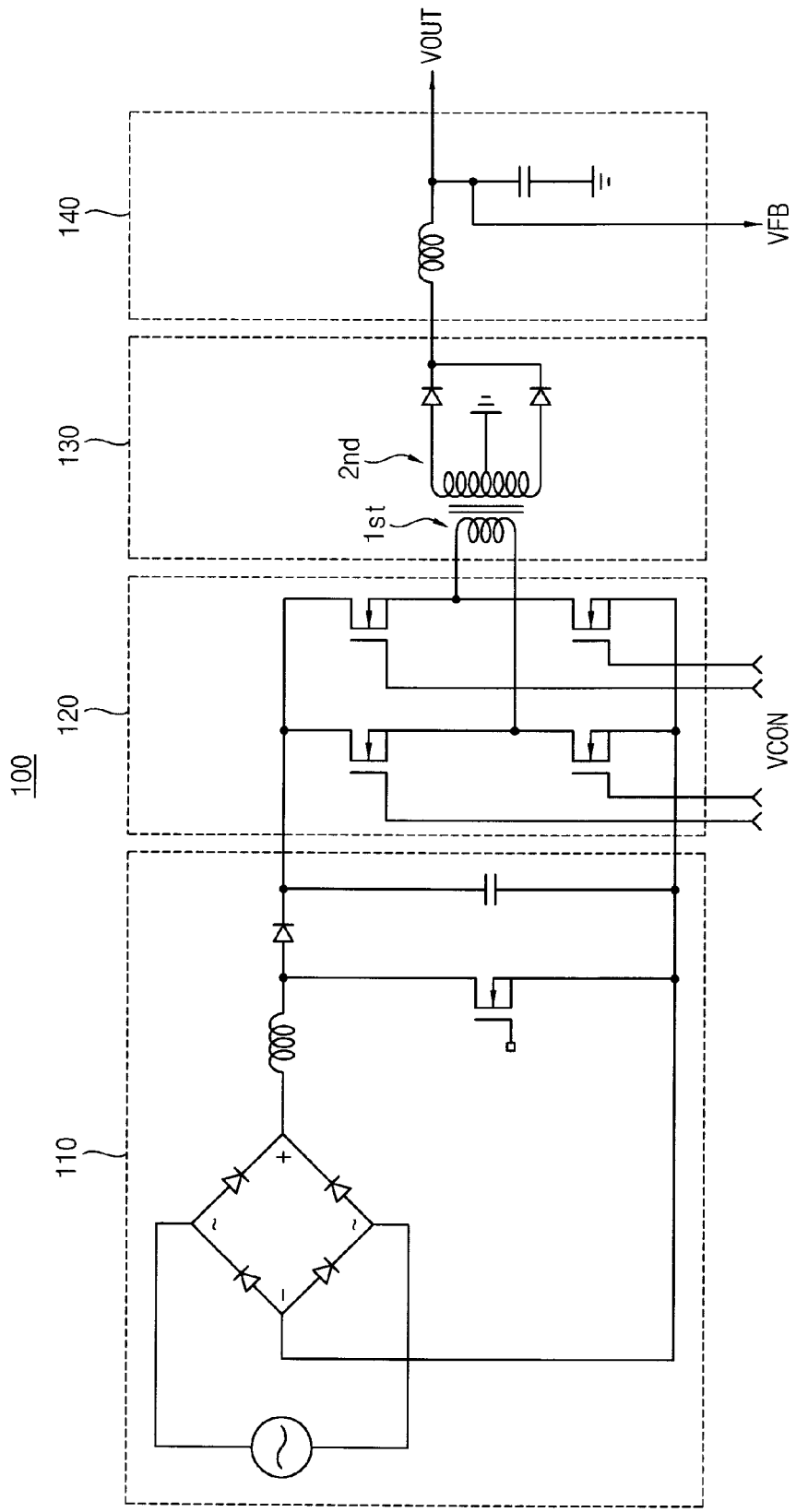
FIG. 2 is a circuit diagram illustrating an embodiment of a switching mode power supply (SMPS) circuit unit in the embodiment of a power supply device of FIG. 1.

FIG. 2 is a circuit diagram illustrating an embodiment of a SMPS circuit unit in the embodiment of a power supply device of FIG. 1. Referring to FIG. 2, the SMPS circuit unit 100 may include an input unit 110, a control unit 120, a transformation unit 130, and an output unit 140.

The input unit 110 may rectify and filter an alternating voltage to generate a direct-current (DC) voltage having a high voltage level. In some embodiments, the input unit 110 may include a bridge rectifier and a power factor correction (PFC) circuit. In addition, although not illustrated in FIG. 2, the input unit 110 may further include a fuse and a line filter between an alternating voltage input stage and the bridge rectifier. The fuse may operate as a safety device that opens and protects a circuit when a current exceeding a critical value flows during a specific period. In some embodiments, the line filter may be a low-pass electro-magnetic interference (EMI) filter. The line filter may prevent signal interferences by reducing a high frequency current that may flow into the alternating voltage input stage in the SMPS circuit unit 100.

The bridge rectifier may convert a bipolar alternating voltage into a unipolar pulsating voltage. The bridge rectifier may have a structure in which a plurality of diodes are coupled in a bridge form, and may provide an output voltage having the same polarity (for example, a positive polarity or a negative polarity) as an input voltage.

The PFC circuit may improve power efficiency by compensating a power-factor of the output voltage. The PFC circuit may reduce power consumption, and may prevent a temperature rise due to a heat generated by currents. Thus, the input unit 110 rectifies the alternating voltage to generate the DC voltage having a high voltage level.

The control unit 120 may receive the DC voltage from the input unit 110. In addition, the control unit 120 may receive the control signal VCON from the PWM control unit 300 (shown in FIG. 1). The control unit 120 may generate a first stage output voltage from the DC voltage based on the control signal VCON. That is, a voltage level of the first stage output voltage may be determined (and/or changed) according to a voltage level of the control signal VCON.

The transformation unit 130 may receive the first stage output voltage from the control unit 120, and may generate the second stage output voltage VOUT by stepping-down the first stage output voltage. Then, the second stage output voltage VOUT may be filtered by the output unit 140. In addition, the second stage output voltage VOUT may be output (and/or fedback) from the output unit 140 to the PWM control unit 300 (shown in FIG. 1) as a feedback voltage signal VFB. Thus, the power supply device 10 may control a voltage level of the power voltage at the first stage 1st (and not at the second stage 2nd) of the transformation unit 130 included in the SMPS circuit unit 100.

Figure 3:
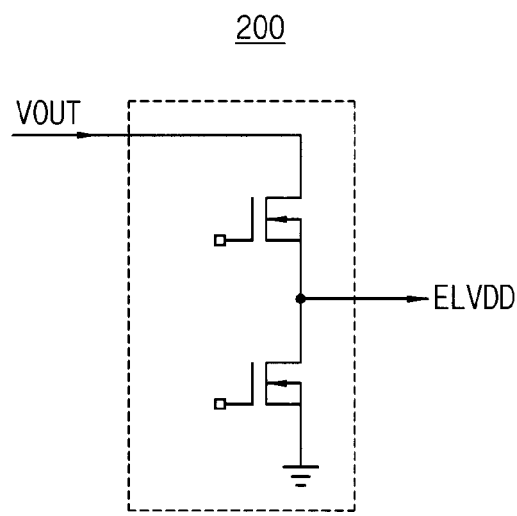
FIG. 3 is a circuit diagram illustrating an embodiment of a power switching unit in the embodiment of a power supply device of FIG. 1.

FIG. 3 is a circuit diagram illustrating an embodiment of a power switching unit in the embodiment of a power supply device of FIG. 1.

Referring to FIG. 3, the power switching unit 200 may include a plurality of transistors. The power switching unit 200 may receive the second stage output voltage VOUT, and may generate the first power voltage ELVDD based on the transistors that periodically turn-on and turn-off. Thus, the first power voltage ELVDD may have a logic high level and a logic low level in one frame. In some embodiments, a switching cycle of the transistors may be about 8.3 ms (i.e., 120 Hz). Thus, a cycle of the first power voltage ELVDD may be about 8.3 ms (i.e., 120 Hz).

In some embodiments, the first power voltage ELVDD may be simultaneously provided to a plurality of pixels included in a display panel. Hence, organic light emitting diodes included in the pixels may simultaneously emit light.

Figure 4:
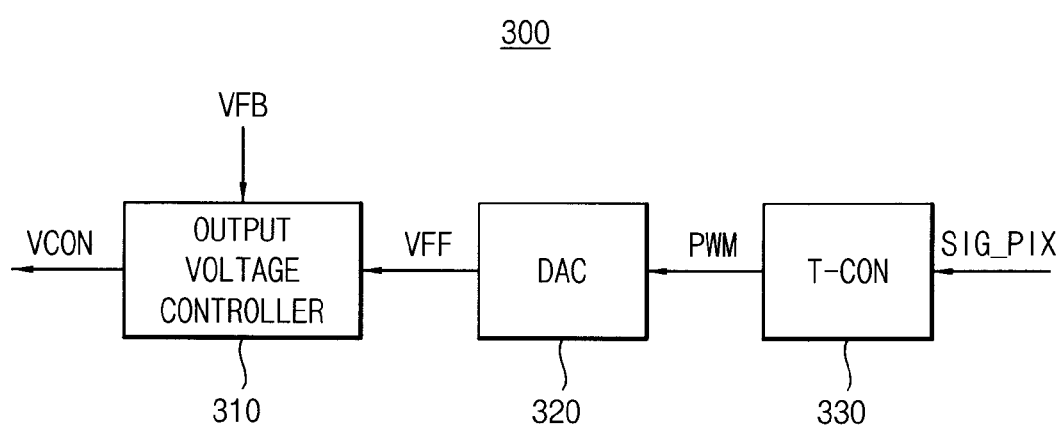
FIG. 4 is a block diagram illustrating an embodiment of a pulse width modulation (PWM) control unit in the embodiment of a power supply device of FIG. 1.

FIG. 4 is a block diagram illustrating an embodiment of a PWM control unit in the embodiment of a power supply device of FIG. 1.

Referring to FIG. 4, the PWM control unit 300 may include a timing controller (T-CON) 330, a digital-to-analog converter (DAC) 320, and an output voltage controller 310.

The timing controller 330 may generate a PWM signal PWM. In some embodiments, the timing controller 330 may receive the pixel information signal SIG_PIX from the memory unit 400 of FIG. 1, and may generate the PWM signal PWM based on the pixel information signal SIG_PIX.

An on-duty ratio of the PWM signal PWM may be controlled based on the pixel information signal SIG_PIX. An on-duty ratio may be a ratio of an on-period (i.e., a period having a logic high level) of the PWM signal PWM to a period corresponding to one frame.

The digital-to-analog converter 320 may receive a PWM signal PWM from the timing controller 330, and may generate a feed-forward voltage signal VFF by converting the PWM signal PWM. In some embodiments, a magnitude of a logic high level of the feed-forward voltage signal VFF may be proportional to an on-duty ratio of the PWM signal PWM.

The output voltage controller 310 may receive the feed-forward voltage signal VFF from the digital-to-analog converter 320, and may generate the control signal VCON based on the feed-forward voltage signal VFF. As described above, the control signal VCON may be applied to the first stage 1st of the SMPS circuit unit 100 of FIG. 1. Thus, a voltage level of the second stage output voltage VOUT and a voltage level of the first power voltage ELVDD may be controlled at the first stage 1st of the SMPS circuit unit 100. In some embodiments, the output voltage controller 310 may receive the second stage output voltage VOUT as the feedback voltage signal VFB. The output voltage controller 310 may stabilize the second stage output voltage VOUT by generating the control signal VCON based on the feedback voltage signal VFB.

Figure 5:
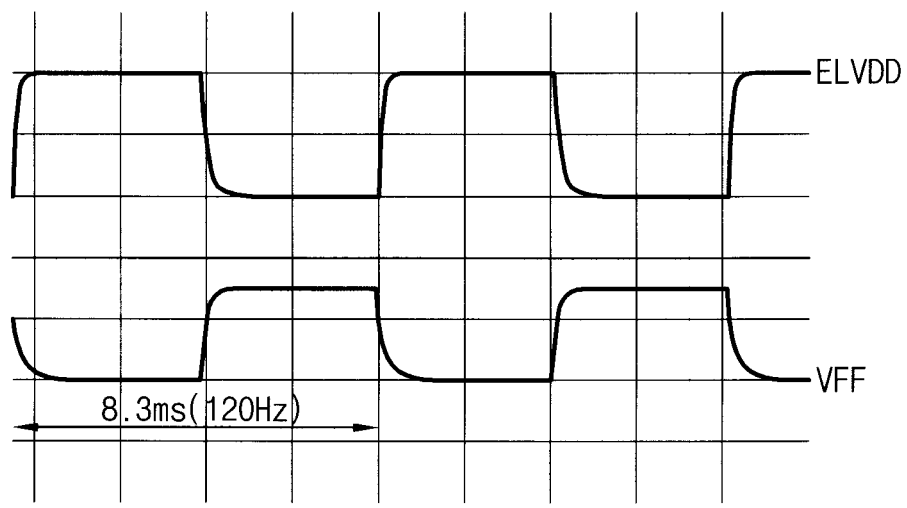
FIG. 5 is a timing diagram illustrating a relation between a first power voltage and a feed-forward voltage signal generated by the embodiment of a power supply device of FIG. 1.

FIG. 5 is a timing diagram illustrating a relation between a first power voltage and a feed-forward voltage signal generated by the embodiment of a power supply device of FIG. 1.

Referring to FIGS. 4 and 5, when a maximum gradation level of an image displayed by the display panel is high, the related information may be included in the pixel information signal SIG_PIX, and an on-duty ratio of the PWM signal PWM may be decreased based on the pixel information signal SIG_PIX. Here, since a magnitude of a logic high level of the feed-forward voltage signal VFF is proportional to an on-duty ratio of the PWM signal PWM, a magnitude of the feed-forward voltage signal VFF may be decreased. As illustrated in FIG. 5, the first power voltage ELVDD may be inversely proportional to the feed-forward voltage signal VFF. Thus, as a magnitude of the feed-forward voltage signal VFF is decreased, a magnitude of a logic low level of the first power voltage ELVDD may be increased. As a result, a voltage difference between the first power voltage ELVDD and a second power voltage ELVSS may be increased in an emission period, and thus an image having a high gradation may be displayed.

When a maximum gradation level of an image displayed by the display panel is low, the related information may be included in the pixel information signal SIG_PIX, and an on-duty ratio of the PWM signal PWM may be increased based on the pixel information signal SIG_PIX. A magnitude of the feed-forward voltage signal VFF may be increased, and a magnitude of a logic low level of the first power voltage ELVDD may be decreased. As a result, a voltage difference between the first power voltage ELVDD and the second power voltage ELVSS may be decreased in an emission period, and thus an image having a low gradation may be displayed.

Figure 6:
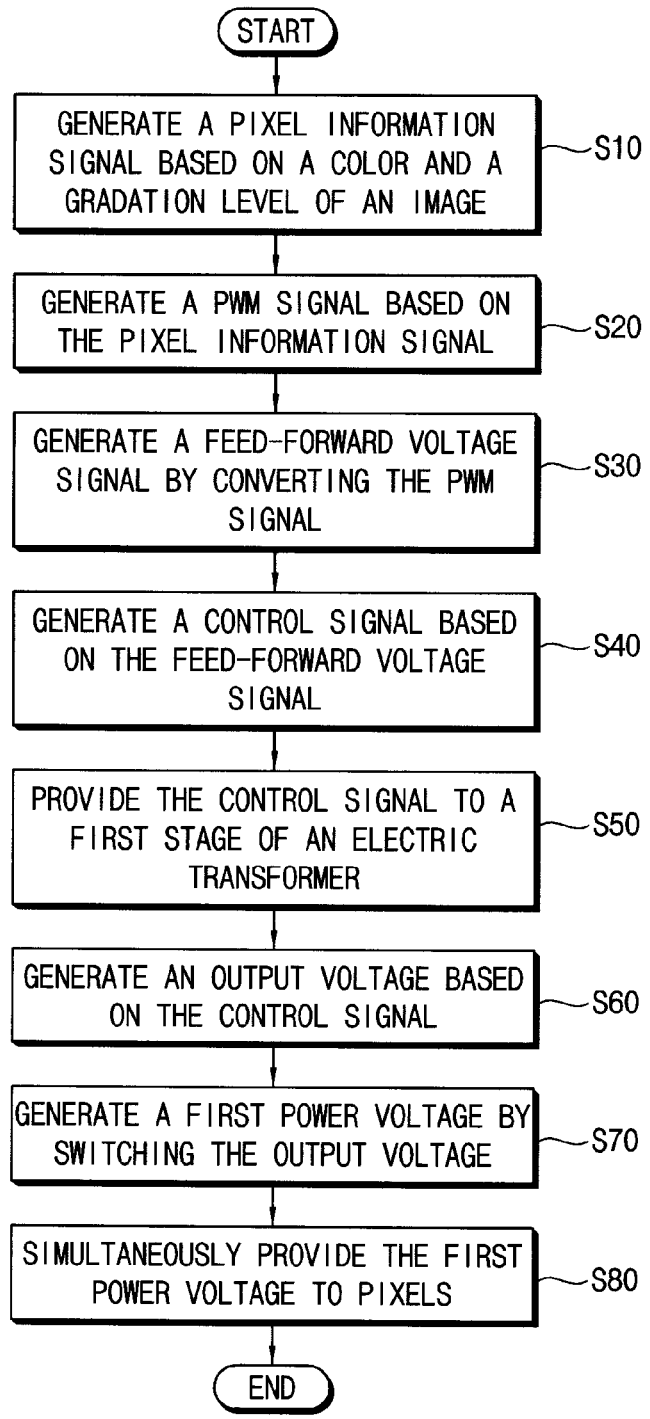
FIG. 6 is a flow chart illustrating an embodiment of a method of supplying power.
Figure 7:
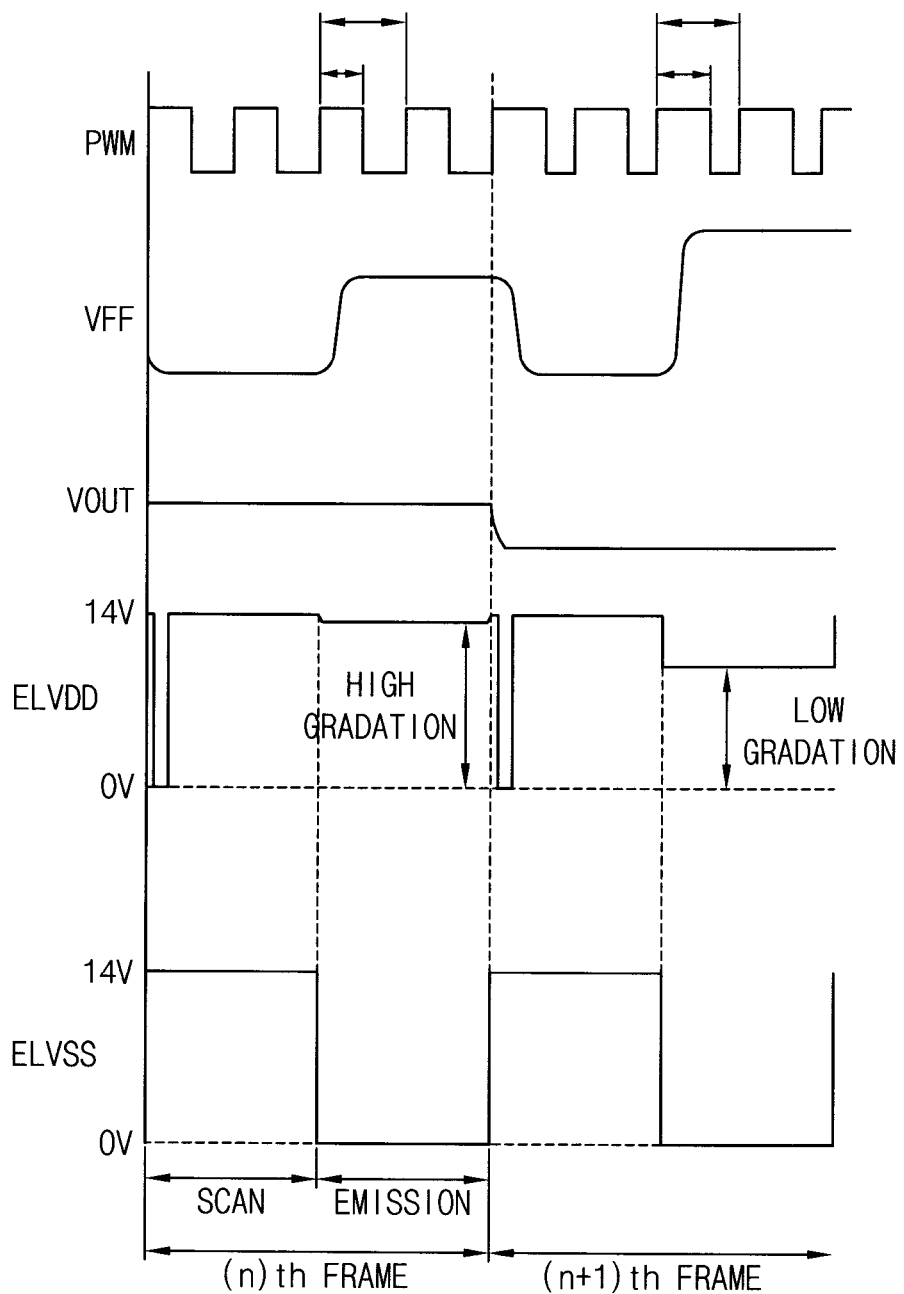
FIG. 7 is a timing diagram illustrating the embodiment of a method of supplying power shown in FIG. 6.

FIG. 6 is a flow chart illustrating an embodiment of a method of supplying power. FIG. 7 is a timing diagram illustrating the embodiment of a method of supplying power shown in FIG. 6.

Referring to FIGS. 1 and 6, the pixel information signal SIG_PIX may be generated based on a color and a gradation level of an image to be displayed by a display panel in a next frame (Block S10). Then, the PWM signal PWM having an on-duty ratio that is determined based on the pixel information signal SIG_PIX may be generated (Block S20). Next, the feed-forward voltage signal VFF as an analog signal may be generated by converting the PWM signal (Block S30).

Referring to FIG. 7, an (n)th frame may correspond to a period in which an image having a relatively high gradation is displayed, and an (n+1)th frame (i.e., a next frame) may correspond to a period in which an image having a relatively low gradation is displayed. Thus, the PWM signal PWM may have an on-duty ratio of about 50% in the (n)th frame, and the PWM signal PWM may have an on-duty ratio of about 75% in the (n+1)th frame. As described above, a magnitude of a logic high level of the feed-forward voltage signal VFF may be proportional to an on-duty ratio of the PWM signal PWM. Thus, a magnitude of a logic high level of the feed-forward voltage signal VFF may be relatively greater in the (n+1)th frame (i.e., a next frame).

Referring back to FIG. 6, based on the feed-forward voltage signal VFF, a control signal VCON for controlling the second stage output voltage VOUT of the electric transformer included in the SMPS circuit unit 100 may be generated (Block S40). In addition, the control signal VCON may be provided to the first stage 1st of the electric transformer (Block S50). Then, an output voltage (i.e., the second stage output voltage VOUT) may be generated based on the control signal VCON (Block S60). As illustrated in FIG. 7, a voltage level of the output voltage VOUT may be proportional to a magnitude of a logic high level of the feed-forward voltage signal VFF. Hence, a voltage level of the output voltage VOUT may be relatively high in the (n)th frame.

The first power voltage ELVDD having a logic high level and a logic low level in one frame may be generated by switching the output voltage VOUT (Block S70). As described above, since the first power voltage ELVDD is inversely proportional to the feed-forward voltage signal VFF, and the first power voltage ELVDD is proportional to the output voltage VOUT, a magnitude of a logic low level of the first power voltage ELVDD may be relatively greater in the (n)th frame. At this time, a logic high level and a logic low level of the second power voltage ELVSS may be maintained (i.e., may not be changed) in all frames. Therefore, a voltage difference between the first power voltage ELVDD and the second power voltage ELVSS is relatively great in an emission period EMISSION of the (n)th frame, and thus an image having a high gradation may be displayed. Likewise, a voltage difference between the first power voltage ELVDD and the second power voltage ELVSS is relatively small in an emission period EMISSION of the (n+1)th frame, and thus an image having a low gradation may be displayed. As shown in FIG. 7, a point at which the first power voltage ELVDD is 0V within a small time in every frame exists. The point means that the first power voltage ELVDD is reset.

Although it is illustrated in FIG. 7 that the first power voltage ELVDD has a voltage level that varies according to a magnitude of an image load (i.e., a variable voltage level) in an emission period EMISSION, and that the second power voltage ELVSS has a constant voltage level in an emission period EMISSION, it is not limited thereto. In some embodiments, for example, the second power voltage ELVSS may have a variable voltage level in an emission period EMISSION.

Returning to FIG. 6, then, the first power voltage ELVDD and the second power voltage ELVSS may be simultaneously provided to the pixels in an emission period EMISSION (Block S80). As a result, organic light emitting diodes included in the pixels may simultaneously emit light.

Figure 8:
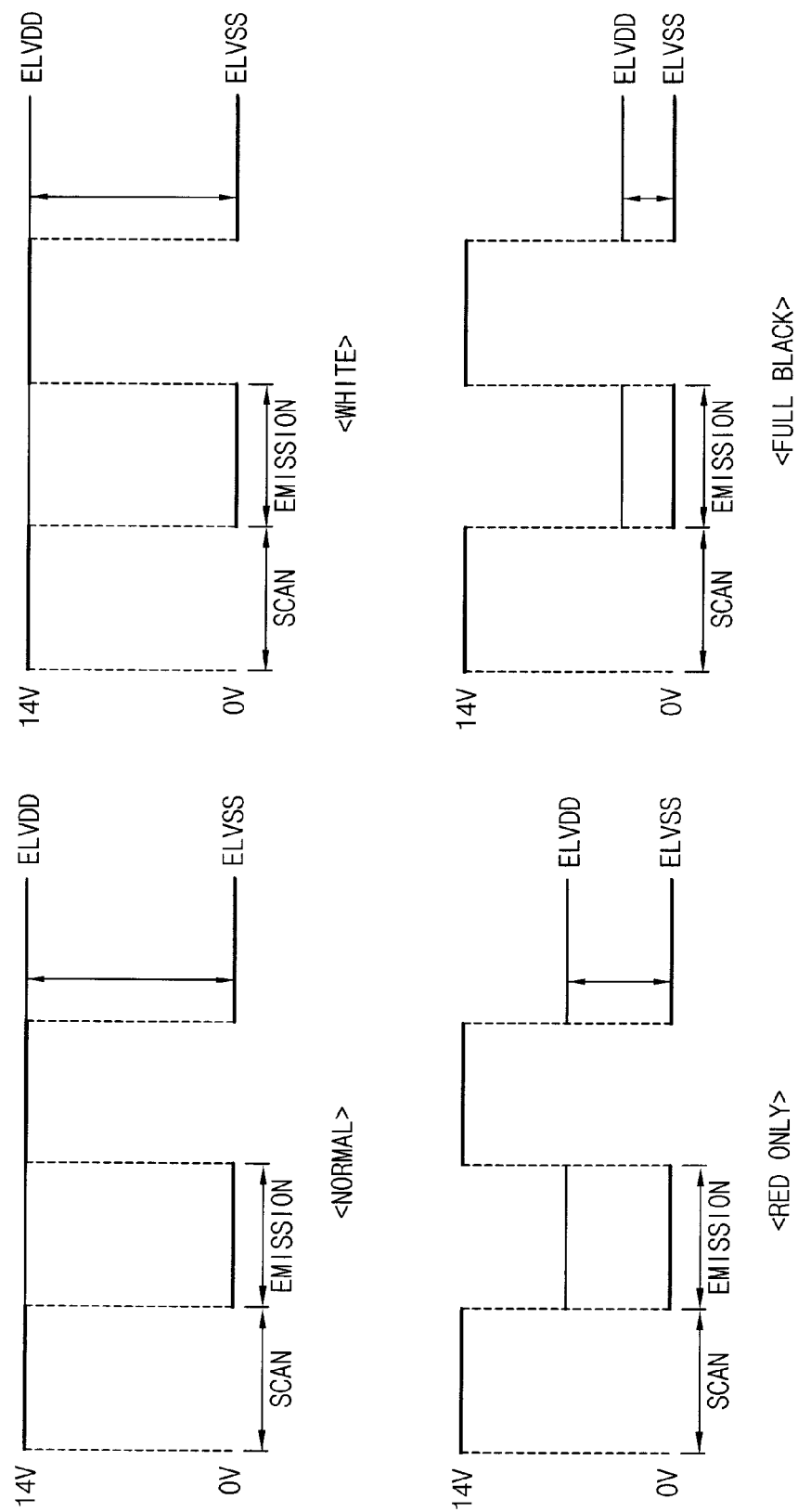
FIG. 8 is a diagram illustrating a first power voltage changed by the embodiment of a method of supplying power shown in FIG. 6.

FIG. 8 is a diagram illustrating a first power voltage changed by an embodiment of the method shown in FIG. 6.

Referring to FIG. 8, a logic high level and a logic low level of the second power voltage ELVSS may be maintained (i.e., may not be changed) regardless of a color or a gradation level of an image that a display panel displays. The first power voltage ELVDD may have different logic low levels according to a color or a gradation level of an image that the display panel displays. For example, in case of a normal period NORMAL, the first power voltage ELVDD having the highest voltage level may be provided in an emission period EMISSION. Thus, a voltage difference between the first power voltage ELVDD and the second power voltage ELVSS is relatively great, and thus an image having a high gradation may be displayed. Since any color may be displayed in the normal period NORMAL, the first power voltage ELVDD may correspond to a white color WHITE having the highest gradation.

On the other hand, when a black color image FULL BLACK is displayed by the display panel, the first power voltage ELVDD having the lowest voltage level may be provided in an emission period EMISSION. Thus, a voltage difference between the first power voltage ELVDD and the second power voltage ELVSS is relatively small, and thus an image having a low gradation may be displayed. As described above, the power supply device according to some embodiments may generate the first power voltage ELVDD that is determined (and/or changed) according to a magnitude of an image load.

Figure 9:
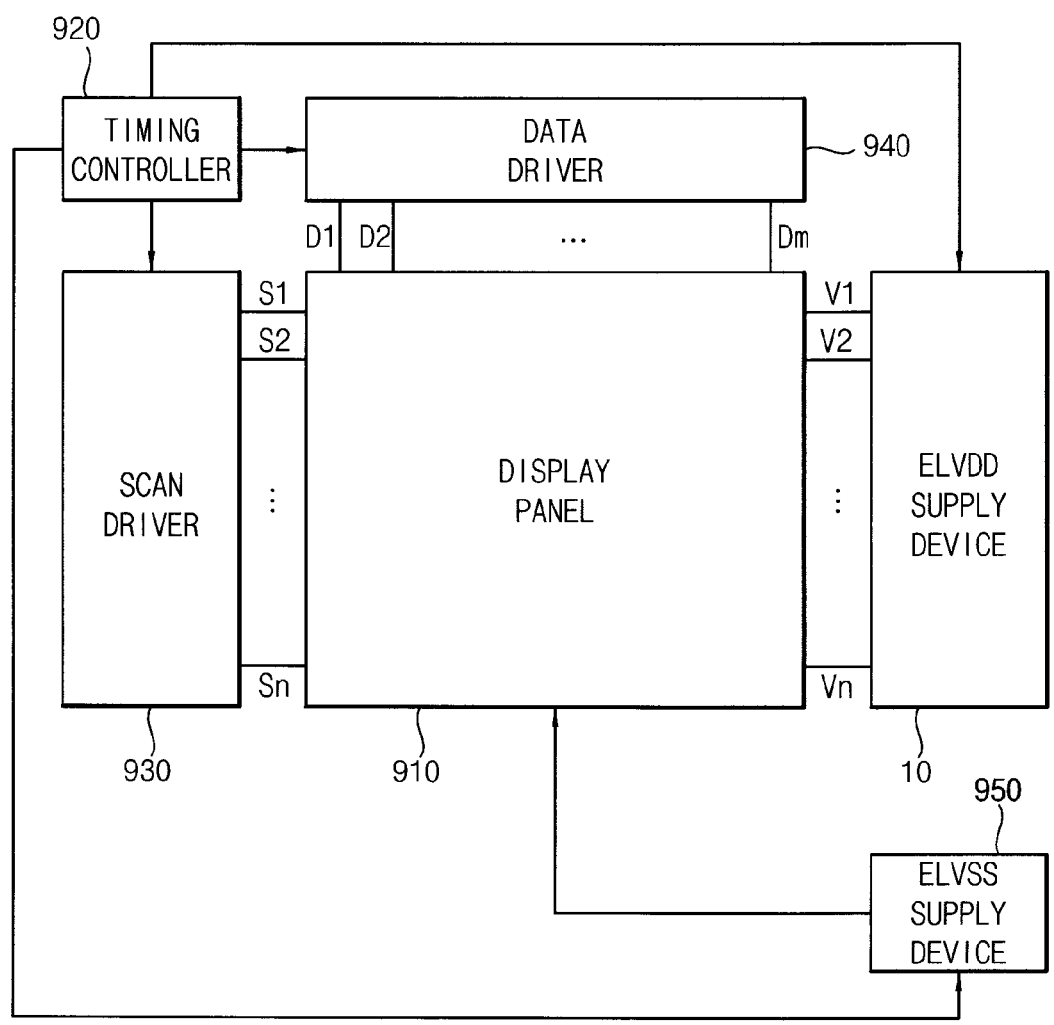
FIG. 9 is a block diagram illustrating an embodiment of an organic light emitting display (OLED) device.

FIG. 9 is a block diagram illustrating an embodiment of an organic light emitting display device.

Referring to FIG. 9, the organic light emitting display device 900 may include a display panel 910, a scan driver 930, a data driver 940, a first power (ELVDD) supply device 10, a second power (ELVSS) supply device 950, and a timing controller 920.

The display panel 910 may include a plurality of pixels. The scan driver 930 may sequentially provide a scan signal to the pixels via a plurality of scan-lines S1 . . . Sn. The data driver 940 may provide a data signal to the pixels via a plurality of data-lines D1 . . . Dn in response to the scan signal that is sequentially provided. The first power supply device 10 may generate a first power voltage (ELVDD) to simultaneously provide the first power voltage ELVDD to the pixels. The first power voltage ELVDD may have a logic high level and a logic low level in one frame. In addition, a magnitude of a logic low level of the first power voltage may be determined (and/or changed) according to a magnitude of an image load. The second power supply device 950 may generate a second power voltage (ELVSS) to simultaneously provide the second power voltage ELVSS to the pixels. The second power voltage ELVSS may have a logic high level and a logic low level in one frame. The timing controller 920 may control the scan driver 930, the data driver 940, the first power (ELVDD) supply device 10, and the second power (ELVSS) supply device 950.

Figure 10:
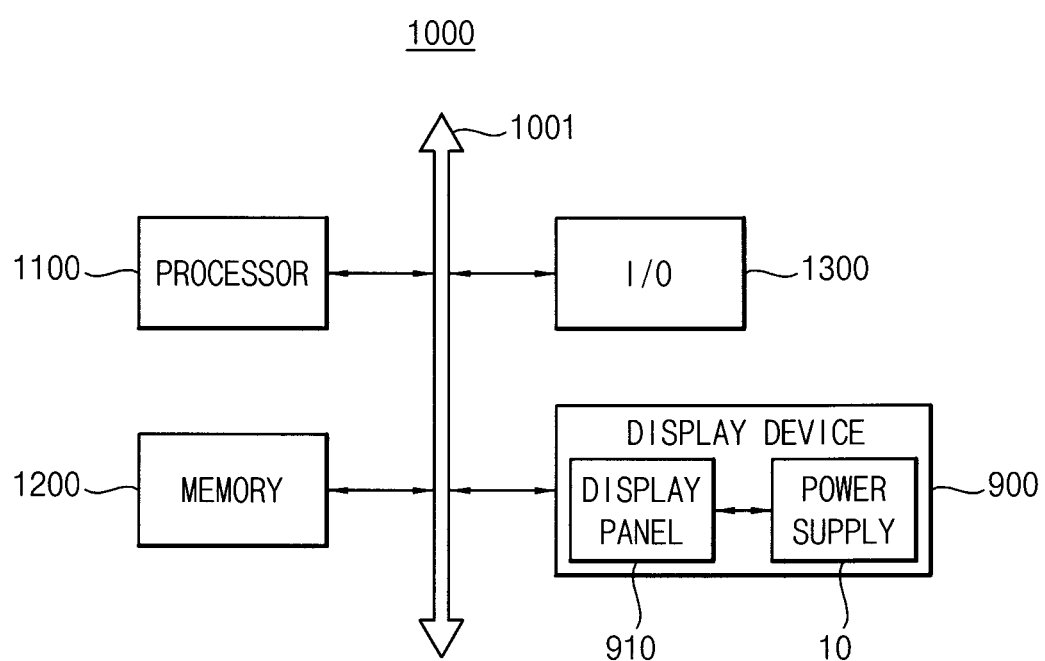
FIG. 10 is a block diagram illustrating an embodiment of an electric device having the embodiment of an organic light emitting display (OLED) device of FIG. 9.

FIG. 10 is a block diagram illustrating an embodiment of an electric device having an embodiment of the organic light emitting display device shown in FIG. 9.

Referring to FIG. 10, the electric device 1000 may include a processor 1100, a memory device 1200, an input/output (I/O) device 1300, and a display device 900.

The processor 1100 may perform various computing functions. For example, the processor 1100 may be a micro processor, a central processing unit (CPU), and the like. The processor 1100 may be coupled to other components via a bus 1001. For example, the processor 1100 may be coupled to the memory device 1200 and the display device 900 via an address bus, a control bus, a data bus, and the like. Further, the processor 1100 may be coupled to an extended bus such as a peripheral component interconnection (PCI) bus.

The memory device 1200 may include at least one non-volatile memory device and at least one volatile memory device. For example, the non-volatile memory device may correspond to an erasable programmable read-only memory (EPROM) device, an electrically erasable programmable read-only memory (EEPROM) device, a flash memory device, and the like. In addition, the volatile memory device may correspond to a dynamic random access memory (DRAM) device, a static random access memory (SRAM) device, and the like. The memory device 1200 may store software that is performed by the processor 1100. In some embodiments, the processor 1100 and the memory device 1200 may analyze and handle a color and a gradation level of an image that the display panel 910 displays. In other embodiments, a memory unit included in the display device 900 may perform the functions (i.e., analyze and handle a color and a gradation level of an image).

The I/O device 1300 may be an input device such as a keyboard, a keypad, a mouse, a touch screen, and the like, and/or an output device such as a printer, a speaker, and the like. The I/O device 1300 may be coupled to the bus 1001. The processor 1100 may control operations of the I/O device 1300.

The display device 900 may be coupled to the processor 1100 via the bus 1001. The display device 900 may include the display panel 910 and the first power supply device 10. As described above, the first power supply device 10 may simultaneously provide a power voltage of which a voltage level is changed according to a magnitude of an image load for the display panel 910. In addition, a voltage level of the power voltage may be controlled at a first stage of an electric transformer included in the first power supply device 10.

The present inventive concepts may be applied to an electric device having a display device. For example, the present inventive concepts may be applied to an electric device such as a cellular phone, a smart phone, a smart pad, a personal digital assistant (PDA), a portable multimedia player (PMP), a digital camera, a computer, a laptop, a digital television, a MP3 player, and the like. The foregoing is illustrative of certain embodiments and is not to be construed as limiting thereof. Although a few embodiments have been described, those skilled in the art will readily appreciate that many modifications are possible in the embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An organic light emitting display device comprising:
   a display panel having a plurality of pixels;
   a scan driver configured to sequentially provide a scan signal to the pixels via a plurality of scan-lines;
   a data driver configured to provide a data signal to the pixels via a plurality of data-lines based on the scan signal;
   a first power supply device configured to generate a first power voltage to simultaneously provide the first power voltage to the pixels, the first power voltage having a logic high level and a logic low level in one frame, a magnitude of a logic low level of the first power voltage being determined according to a magnitude of an image load, wherein the magnitude of the image load is determined by a color and a gradation level of an image to be displayed in a next frame;
   a second power supply device configured to generate a second power voltage to simultaneously provide the second power voltage to the pixels, the second power voltage having a logic high level and a logic low level in one frame; and
   a timing controller configured to control the scan driver, the data driver, the first power supply device, and the second power supply device.

2. The device of claim 1, wherein a period of a logic high level corresponds to a period in which the pixels are sequentially scanned, and a period of a logic low level corresponds to a period in which organic light emitting diodes of the pixels simultaneously emit light.

3. The device of claim 2, further comprising:
   a memory unit configured to provide a pixel information signal to the first power supply device.

4. The device of claim 3, wherein the pixel information signal includes information related to the color and the gradation level of the image to be displayed by the pixels in a next frame.

5. The device of claim 4, wherein the first power supply device generates a PWM signal based on the pixel information signal, and
   wherein the magnitude of a logic low level of the first power voltage is controlled based on an on-duty ratio of the PWM signal.

* * * * *